US011722798B2

(12) United States Patent
Ishii et al.

(10) Patent No.: US 11,722,798 B2
(45) Date of Patent: *Aug. 8, 2023

(54) SOLID-STATE IMAGING APPARATUS AND METHOD OF DRIVING THE SAME

(71) Applicant: PANASONIC INTELLECTUAL PROPERTY MANAGEMENT CO., LTD., Osaka (JP)

(72) Inventors: Motonori Ishii, Osaka (JP); Yoshiyuki Matsunaga, Kyoto (JP); Yutaka Hirose, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 309 days.

This patent is subject to a terminal disclaimer.

(21) Appl. No.: 17/111,219

(22) Filed: Dec. 3, 2020

(65) Prior Publication Data

US 2021/0092316 A1 Mar. 25, 2021

Related U.S. Application Data

(63) Continuation of application No. 16/178,396, filed on Nov. 1, 2018, now Pat. No. 10,897,590, which is a (Continued)

(30) Foreign Application Priority Data

Nov. 27, 2012 (JP) .................................. 2012-258139

(51) Int. Cl.
*H04N 25/65* (2023.01)
*H04N 25/75* (2023.01)
(Continued)

(52) U.S. Cl.
CPC ............. *H04N 25/65* (2023.01); *H04N 25/75* (2023.01); *H04N 25/767* (2023.01); *H04N 25/77* (2023.01)

(58) Field of Classification Search
CPC .... H04N 5/363; H04N 5/3742; H04N 5/3745; H04N 5/378; H04N 25/65; H04N 25/75; H04N 25/767; H04N 25/77
See application file for complete search history.

(56) References Cited

U.S. PATENT DOCUMENTS 4,363,963 A 12/1982 Ando
6,344,877 B1 2/2002 Gowda et al.
(Continued)

FOREIGN PATENT DOCUMENTS

JP S55-120182 A 9/1980
JP 2004-312724 A 11/2004
(Continued)

OTHER PUBLICATIONS

Non-Final Office Action issued in U.S. Appl. No. 16/178,396, dated Apr. 30, 2020.
(Continued)

*Primary Examiner* — Thanh Luu
(74) *Attorney, Agent, or Firm* — McDermott Will & Emery LLP

(57) ABSTRACT

An imaging device including: a photoelectric converter that generates signal charge; a charge storage region that stores the signal charge; a first transistor that has a gate coupled to the charge storage region and reads out the signal charge; a second transistor that, has a source and a drain, an output of the first transistor being fed back to one of the source and the drain and being supplied to the charge storage region from the other of the source and the drain; and voltage supply circuitry that supplies voltages varying with time. In a reset
(Continued)

operation for discharging the signal charge stored in the charge storage region, the voltage supply circuitry supplies the voltages to a gate of the second transistor so that the second transistor gradually changes from an OFF state to an ON state.

14 Claims, 14 Drawing Sheets

Related U.S. Application Data continuation of application No. 14/714,366, filed on May 18, 2015, now Pat. No. 10,212,371, which is a continuation of application No. PCT/JP2013/005188, filed on Sep. 3, 2013.

(51) Int. Cl.
*H04N 25/77* (2023.01)
*H04N 25/767* (2023.01)

(56) References Cited

U.S. PATENT DOCUMENTS

| | | | |
|---|---|---|---|
| 6,532,040 B1 | 3/2003 | Kozlowski et al. | |
| 6,587,142 B1 | 7/2003 | Kozlowski et al. | |
| 6,777,660 B1 | 8/2004 | Lee | |
| 6,965,707 B1 | 11/2005 | Kozlowski | |
| 8,232,616 B2 | 7/2012 | Maehara et al. | |
| 9,456,159 B1 | 9/2016 | Hynecek | |
| 10,897,590 B2 * | 1/2021 | Ishii | H04N 5/3745 |
| 2004/0196397 A1 | 10/2004 | Beck et al. | |
| 2004/0227828 A1 | 11/2004 | Loose | |
| 2008/0135895 A1 | 6/2008 | Lee et al. | |
| 2009/0101798 A1 | 4/2009 | Yadid-Pecht et al. | |
| 2011/0049591 A1 | 3/2011 | Nakatani et al. | |
| 2011/0090374 A1 | 4/2011 | Huang et al. | |
| 2011/0199106 A1 * | 8/2011 | Lotto | H04N 5/378 324/649 |
| 2012/0200752 A1 | 8/2012 | Matsunaga | |
| 2013/0341491 A1 | 12/2013 | Hirose et al. | |
| 2014/0146211 A1 | 5/2014 | Mori et al. | |
| 2015/0288898 A1 | 10/2015 | Yazawa et al. | |
| 2016/0190187 A1 | 6/2016 | Nishimura et al. | |

FOREIGN PATENT DOCUMENTS

| | | |
|---|---|---|
| JP | 2011-071481 A | 4/2011 |
| JP | 2012-114838 A | 6/2012 |
| WO | 2000/019706 A1 | 4/2000 |
| WO | 2008/146236 A1 | 12/2008 |
| WO | 2008/146263 A2 | 12/2008 |
| WO | 2011/058684 A1 | 5/2011 |
| WO | 2012/117670 A1 | 9/2012 |

OTHER PUBLICATIONS

Notice of Allowance issued in U.S. Appl. No. 16/178,396, dated Sep. 4, 2020.
International Search Report of PCT Application No. PCT/JP2013/005188 dated Nov. 19, 2013.
Notice of Allowance issued in U.S. Appl. No. 14/714,366 dated Aug. 16, 2018.
Final Office Action issued in U.S. Appl. No. 141714,366 dated Sep. 8, 2017.
Non-Final Office Action issued in U.S. Appl. No. 14/714,366 dated Feb. 8, 2017.

\* cited by examiner

SOLID-STATE IMAGING APPARATUS AND METHOD OF DRIVING THE SAME

CROSS REFERENCE

This application is a Continuation of U.S. patent application Ser. No. 16/178,396, filed on Nov. 1, 2018, which is Continuation application of U.S. application Ser. No. 14/714,366 filed May 18, 2015, now U.S. Pat. No. 10,212,371, which is a continuation of International Application No. PCT/JP2013/005188 filed Sep. 3, 2013, which in turn, claims the benefit of Japanese Application No. 2012-258139 filed Nov. 27, 2012, the entire contents of each are hereby incorporated by reference.

TECHNICAL FIELD

The present invention relates to a solid-state imaging apparatus, and more particularly to a stacked solid-state imaging apparatus and a method of driving the same.

BACKGROUND ART

An example of stacked solid-state image sensor is disclosed in PTL1 of the Patent Literature. In this stacked solid-state image sensor, a photoelectric conversion film is formed on a control electrode, and a transparent electrode layer is formed on the photoelectric conversion film. In the stacked solid-state imaging apparatus, a voltage applied to the transparent electrode acts on the control electrode via the photoelectric conversion film to convert optical information to an electric signal with a favorable SNR (signal-to-noise ratio).

The stacked solid-state image sensor has such a structure that includes a semiconductor substrate on which a pixel circuit is formed, and a photoelectric conversion film formed on the semiconductor substrate through an insulating film. Accordingly, it is possible to form the photoelectric conversion film by using a material that has a large optical absorption coefficient such, for example, as amorphous silicon.

However, the stacked solid-state image sensor disclosed in PTL1 generates a noise when a signal charge is reset. Specifically, the stacked solid-state image sensor disclosed in PTL1 has such a problem that a random noise (reset noise) is generated at a trailing edge of a reset pulse contained in a reset signal due to capacitive coupling between a reset signal line and a pixel electrode and the like. Since the stacked solid-state image sensor is unable to perform complete charge transfer, it cannot completely cancel the reset noise (the kTC noise) even if it performs sampling by a correlated double sampling circuit (hereafter referred to as a CDS circuit) in the manner as used in the general pinned photodiode type solid-state imaging apparatus. Since a next signal charge is added to the charge after each reset operation in the state that the generated noise remains, a signal charge on which the reset noise is superposed will be read out. For this reason, the stacked solid-state image sensor disclosed in PTL1 has such a problem that the random noise becomes large.

To reduce the kTC noise, a technique as disclosed in PTL2 of the Patent Literature has been proposed. A pixel part of adjacent four pixels and its peripheral circuit disclosed in PTL2 are shown in FIG. 14. Each of the regions surrounded by dotted lines 31a to 31d indicates a pixel. Elements 37a to 37d are reset transistors, and elements 43a to 43d are select transistors. Terminals 40a and 40b are terminals for respectively applying voltages to gates of the select transistors. Terminals 45a and 45b are terminals for applying voltages to gates of the reset transistors. An operation of discharging the charge stored in the storage region is performed by completely turning ON the reset transistor in each of the pixels in a selected row and then turning OFF the reset, transistor. A readout signal from a readout transistor is input through a vertical signal line to negative feedback amplifier 33a or 33b disposed in each column, and an output signal from the negative feedback amplifier is fed back to the source of the reset transistor. The purpose of this structure is to cancel the noise by feeding back the noise signal in a negative feedback manner to the charge storage region, or the noise source, when the reset transistor is in a completely turned ON state.

CITATION LIST

Patent Literature

PTL 1: Unexamined Japanese Patent Publication No. S55-120182
PTL 2: U.S. Pat. No. 6,777,660

SUMMARY OF THE INVENTION

The technique disclosed in PTL2 cancels the noise signal by adding the opposite-phase noise signal only at the time of discharging the charge, or when the reset transistor is in the conductive state (completely turned ON or turned ON in a weak inversion state). At this time, as the reset transistor is turned OFF, the bandwidth of the entire circuit reduces, so that a delay occurs to cancel high frequency noise components. In other words, the technique disclosed in PTL2 has such a problem that it takes time to perform the reset operation.

In view of the above problems, an object of the present invention is to provide a solid-state imaging apparatus that can largely reduce the time required for cancelling the noise and a method of driving the same.

To solve the above problems, an imaging device comprising: a photoelectric converter that generates signal charge; a charge storage region that stores the signal charge; a first transistor that has a gate coupled to the charge storage region and reads out the signal charge; a second transistor that has a source and a drain, an output of the first transistor being fed back to one of the source and the drain and being supplied to the charge storage region from the other of the source and the drain; and voltage supply circuitry that supplies voltages varying with time, wherein in a reset operation for discharging the signal charge stored in the charge storage region, the voltage supply circuitry supplies the voltages to a gate of the second transistor so that the second transistor gradually changes from an OFF state to an ON state.

The solid-state imaging apparatus according to the present disclosure makes it possible to provide a solid-state imaging apparatus that can largely reduce the time required for noise cancelling, and a method of driving the apparatus.

DESCRIPTION OF EMBODIMENTS

Hereinafter, a solid-state imaging apparatus and a method of driving the same according to the present; invention will be described with reference to the drawings. The present invention be described by using the following exemplary embodiments and the accompanying drawings. However, these are provided for the purpose of exemplifying the present invention. Accordingly, it is not intended to limit the present invention to these exemplary embodiments.

First Exemplary Embodiment

Figure 1:
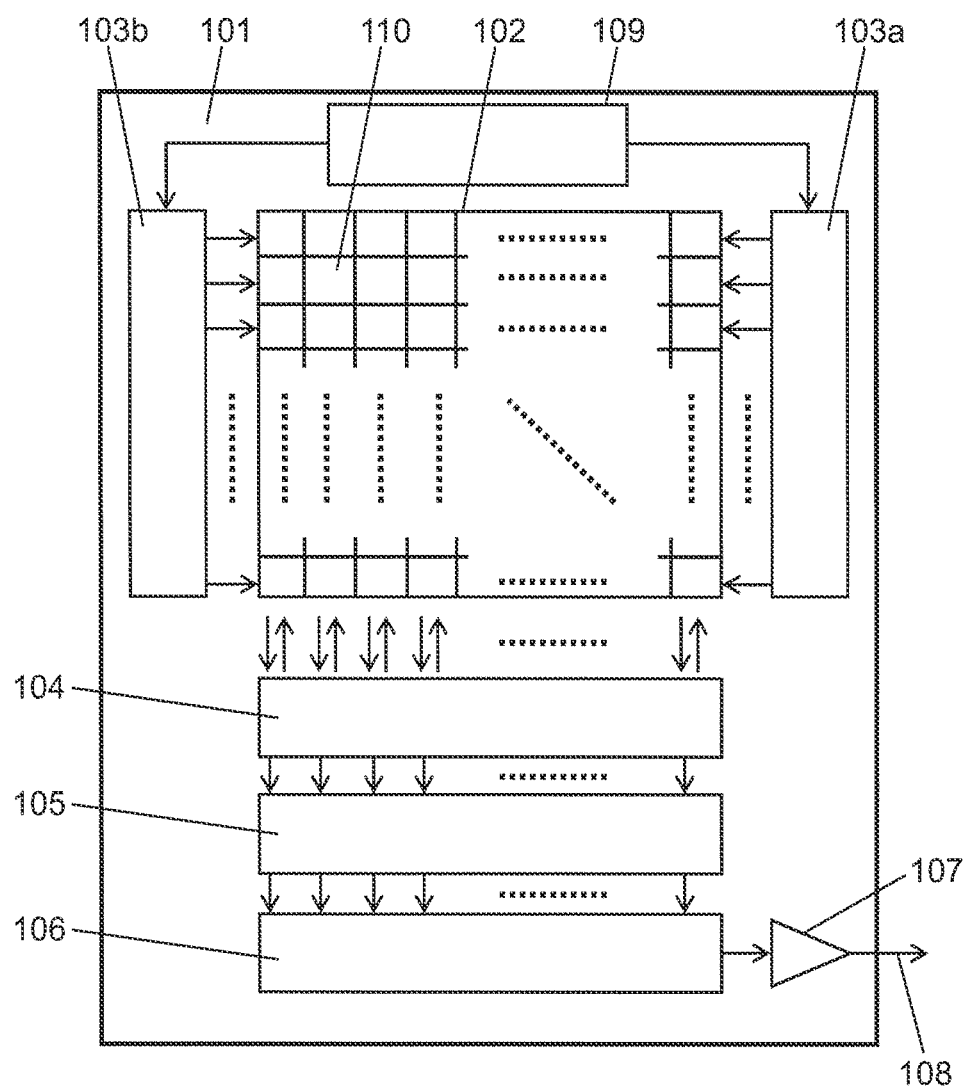
FIG. 1 is a block diagram showing a configuration of a solid-state imaging apparatus according to a first exemplary embodiment.

First, an overall configuration of a solid-state imaging apparatus according to a first exemplary embodiment will be described. FIG. 1 is a block diagram showing a configuration of solid-state imaging apparatus 101 according to the first, exemplary embodiment.

Solid-state imaging apparatus 101 has pixel array 102 composed of a plurality of pixels 110, row signal drive circuits 103a and 103b, column circuits 104 disposed on a column by column basis, noise canceller circuits 105 such, for example, as correlated double sampling (CDS) circuits disposed on a column by column basis, horizontal drive circuit 106, output stage amplifier 107, and sensor output 108.

Circuit 109 is a tapered waveform generating circuit. A signal generated by this circuit is applied, at the time of resetting each row, to the respective reset transistors of the pixels in the row through row signal drive circuits 103a and 103b.

Figure 2:
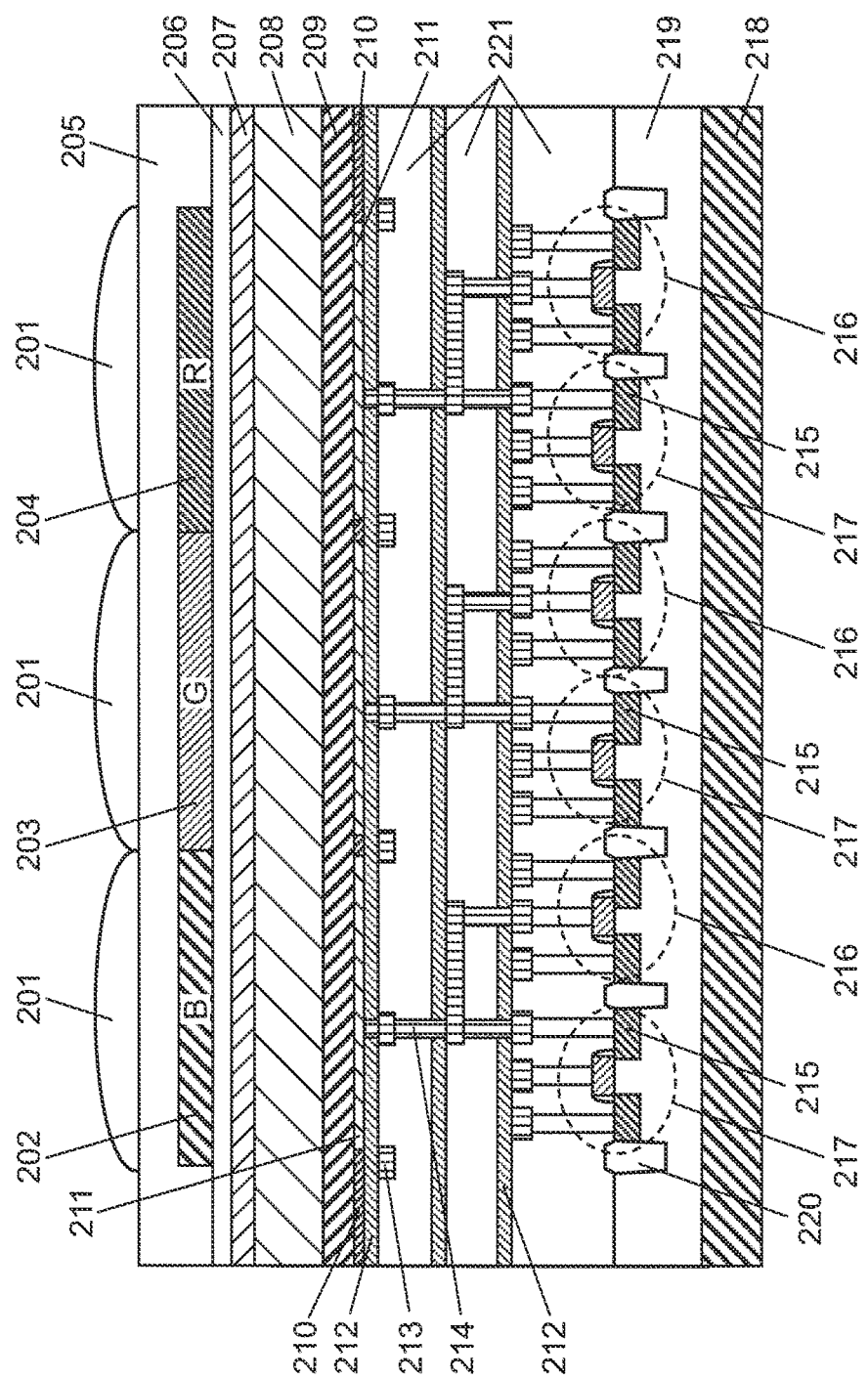
FIG. 2 is a sectional view of the solid-state imaging apparatus according to the first exemplary embodiment.

FIG. 2 is a sectional view showing an area containing three pixels of solid-state imaging apparatus 101. Actually, for example, 10 million pixels are arranged in pixel array 102. A circuit diagram of each pixel will be described later.

As shown in FIG. 2, solid-state imaging apparatus 101 has microlenses 201, blue color filters 202, green color filters 203, red color filters 204, protective film 205, planarization film 206, upper electrode 207, photoelectric conversion film 208, electron blocking layer 209, interelectrode insulating films 210, lower electrodes 211, interwiring insulating films 212, power feeding layers 213, wiring layers 214, substrate 218, well 219 formed in substrate 218, shallow trench isolation (STI) regions 220, and interlayer dielectric layers 221. Incidentally, isolation regions 220 may not be limited to the STI regions, and may be implant isolation regions.

Substrate 218 is a semiconductor substrate such, for example, as a silicon substrate. In well 219 in substrate 218, a plurality of transistors are formed to configure signal readout circuits each for reading out of a pixel a signal charge produced by photoelectric conversion in photoelectric conversion film 208 as a signal voltage (a readout signal). The plurality of transistors include amplifying transistors 216, select transistors (not shown), and reset transistors 217.

Microlenses 201 are formed on a pixel by pixel basis on an outermost surface of solid-state imaging apparatus 101 to efficiently collect incident light.

Blue color filters 202, green color filters 203 and red color filters 204 are formed to produce a color image. Also, blue color filters 202, green color filters 203 and red color filters 204 are formed immediately beneath respective microlenses 201 and in protective film 205. To form microlenses 201 and the group of color filters throughout the 10 million pixels without causing light collection unevenness and color unevenness, these optical elements are formed on planarization film 206. Planarization film 206 is formed by, for example, SiN.

Upper electrode 207 is formed beneath planarization film 206 to extend Over entire pixel array 102. Upper electrode 207 transmits visible light. Upper electrode 207 is formed by, for example, an indium tin oxide (ITO).

Photoelectric conversion film 208 converts light to a signal charge. Specifically, photoelectric conversion film 208 is formed beneath upper electrode 207, and is composed of organic molecules having a high optical absorption capacity. Also, photoelectric conversion film 208 has a thickness of for example, 500 nm. Also, photoelectric conversion film 208 is formed by using vacuum deposition. The above-mentioned organic molecules have a high optical absorption capacity over the entire visible wavelength range from 400 nm to 700 nm.

Electron blocking layer 209 is formed beneath photoelectric conversion film 208 to conduct holes generated by photoelectric conversion of the incident light, as well as to block injection of electrons from lower electrodes 211. Electron blocking layer 209 is formed on interelectrode insulating films 210 and lower electrodes 211, both of which have a high degree of flatness.

The plurality of lower electrodes 211 are arranged in a matrix above substrate 218. Also, the plurality of lower electrodes 211 are electrically isolated from one another. Specifically, lower electrodes 211 are formed between interelectrode insulating films 210 to collect holes generated at photoelectric conversion film 208. Lower electrodes 211 are made, for example, of TiN. Also, lower electrodes 211 are formed on flattened interwiring insulating layers 212 having a thickness of 100 nm.

Also, each adjacent two lower electrodes 211 are isolated from each other by a distance of 0.2 □m. The isolation regions are also filled with interelectrode insulating films 210.

Further, power feeding layers 213 are disposed beneath interwiring films 212 below the isolation regions. Power feeding layers 213 are made, for example, of Cu. Specifically, each of power feeding layers 213 is formed in an area between adjacent two lower electrodes 211 and between a lower electrode 211 and substrate 218. Power feeding layers 213 can be supplied with a potential which is independent of the potential applied to lower electrodes 211. Specifically, during an exposure operation in which photoelectric conversion films 208 perform photoelectric conversion and during a readout operation in which the signal readout circuits produce readout signals, power feeding layers 213 are supplied with a potential for discharging the signal charge. For example, in a case where the signal charge is caused by holes, a positive voltage is applied to power feeding layers 213. This can prevent, holes from being mixed into each pixel from an adjacent pixel. Such a control of voltage application may be performed by a controller (not shown) provided in solid-state imaging apparatus 101. Lower electrodes 211 are electrically connected to wiring layers 214.

It should be understood that the pixel structure shown in FIG. 2 is a preferred example, and that the present invention is not limited to the pixel structure as described above.

Next, a configuration of each signal readout circuit according to the present exemplary embodiment will be described in more detail. Each wiring layer 214 is connected to floating diffusion (FD) region (charge storage region) 215 of the signal readout circuit and a gate terminal of amplifying transistor 216. FD region 215 is electrically connected to either one of a diffusion region becoming a source or a diffusion region becoming a drain of reset transistor 217. Here, the FD region and the reset transistor share the diffusion region. Incidentally, the diffusion region of the FD region and the diffusion region becoming the source or drain of the reset transistor may be formed separately from each other and then electrically connected to each other. All of the reset transistors, the amplifying transistors, the select transistors (not shown) and FD regions 215 are formed within the same T-type well 219. Well 219 is formed in substrate 218. That is, the signal readout circuit is formed in substrate 218, and detects a change in current or voltage generated at each of the plurality of lower electrodes 211 to produce a readout signal corresponding to the signal charge. Also, amplifying transistor 216 amplifies a change in current or voltage generated at a corresponding lower electrode 211 to produce the readout signal.

Also, the transistors are electrically isolated from one another by shallow trench isolation (STI) regions 220.

Also, the gate terminal of each reset transistor 217 is connected to a reset transistor control line (not shown) so that each reset transistor 217 is controlled to turn ON or OFF by a voltage of the reset transistor control line. For example, each reset transistor 217 becomes ON when the voltage of the reset transistor control line is a high level, and each reset transistor 217 becomes OFF when the voltage of the reset transistor control line is a low level.

Also, the gate terminal of each select transistor is connected to a select transistor control line (not shown) so that the select transistor is controlled to turn ON or OFF by a voltage of the select transistor control line. For example, each select transistor becomes ON when the voltage of the select transistor control line is a high level, and each select transistor becomes OFF when the voltage of the select transistor control line is a low level.

Figure 3:
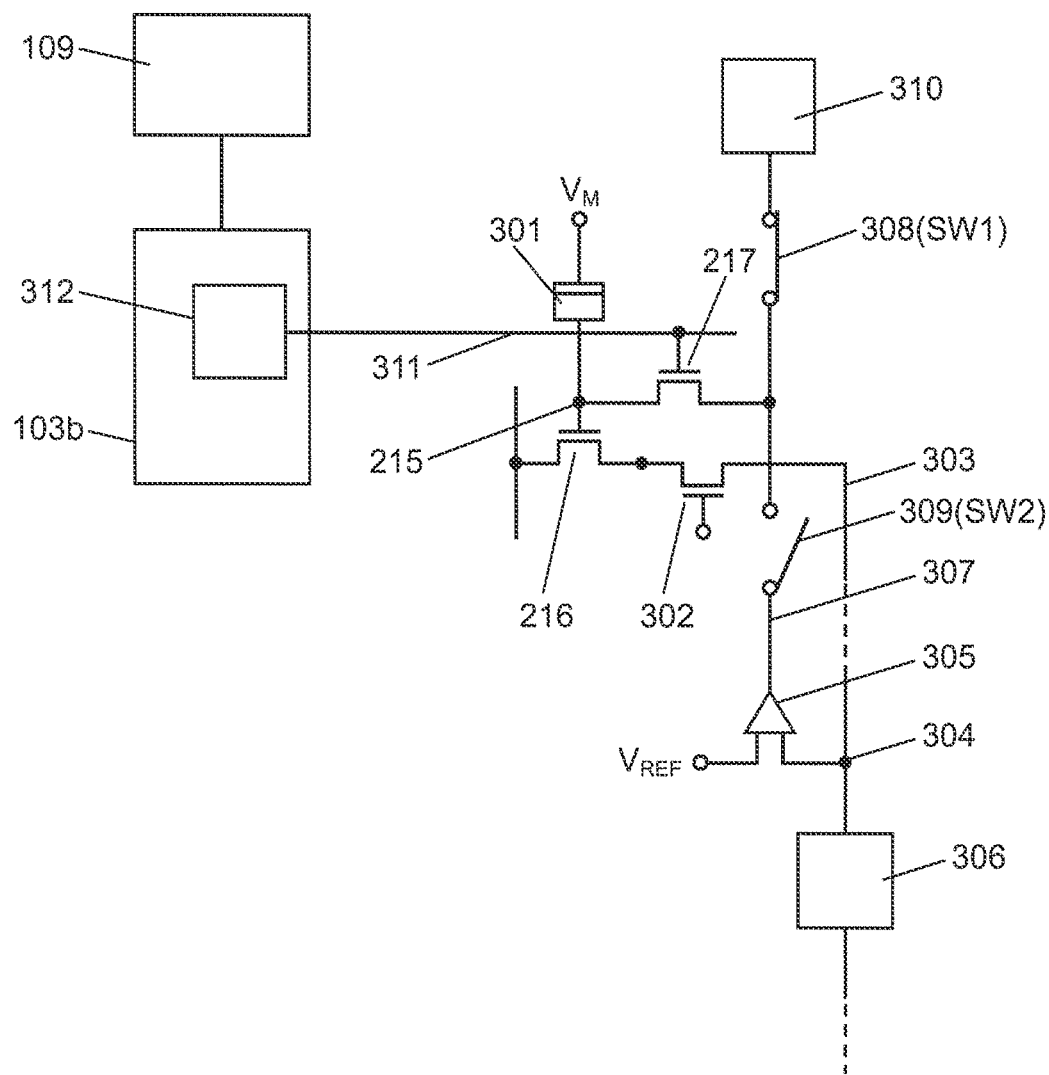
FIG. 3 is a circuit diagram of the solid-state imaging apparatus according to the first exemplary embodiment.

FIG. 3 is a diagram showing an example circuit of pixel 110 which belongs to an m-th row (m: a natural number) and an n-th column (n: a natural number) in pixel array 102 and its control circuit according to the first exemplary embodiment. Pixel 110 has photoelectric conversion region 301, and a signal readout circuit which is a circuit for reading out a signal charge generated at the photoelectric conversion region. The signal readout circuit has FD region 215, amplifying transistor 216, select transistor 302, and reset transistor 217.

Photoelectric conversion region 301 has upper electrode 207, photoelectric conversion film 208, electron blocking layer 209, and lower electrode 211, and performs photoelectric conversion of incident light to produce a signal charge corresponding to the amount of the incident light. At this time, upper electrode 207 is biased to specified bias level $V_M$. One of the source and drain of select transistor 302 is connected to one of the source and drain of amplifying transistor 216, and the other of the source and drain of select transistor 302 is connected to column signal line 303. The other of the source and drain of amplifying transistor 216 is connected to a power source (not shown). Select transistor 302 controls whether or not to transmit a signal detected by amplifying transistor 216 to column signal line 303. Column signal line 303 is branched at branch point 304 to two routes, one of which is connected to an input terminal of feedback amplifier 305, and the other of which is connected to column signal readout circuit 306. Feedback amplifier 305 is a differential amplifier having two input terminals, one of which is connected with column signal line 303. Reference voltage level $V_{REF}$ is input to the other of the two input terminals of feedback amplifier 305. An output of feedback amplifier 305 is connected to column signal line 307, and in turn connected through switch (SW2) 309 to the other of the source and drain of reset transistor 217, that is, to the side opposite to the FD region. Feedback amplifier 305 forms a negative feedback circuit that feeds back the output of the signal readout circuit in a negative feedback manner to the other of the source and drain of the reset transistor. The negative feedback circuit may not be limited to the differential amplifier, and may be any circuit that can feed back the output of the signal readout circuit in a negative feedback manner. The other of the source and drain of reset transistor 217 is also connected through switch (SW1) 308 to reset level generating circuit 310. As described above, the one of the source and drain of reset transistor 217 is connected to FD region 215. The gate of reset transistor 217 is connected to row signal line 311 which is output from row signal drive circuits 103a and 103b. Each of row signal drive circuits 103a and 103b includes output buffer circuit 312 which is connected at its input to an output of tapered waveform generating circuit 109 and at its output to row signal line 311. Feedback amplifier 305 is included in column circuit 104, and column signal readout circuit 306 is included in noise canceller circuit 105. Tapered waveform generating circuit 109 and reset level generating circuit 310 may be mounted on either the same chip as or a separate chip from that of solid-state imaging apparatus 101.

Although, it has been described in the present exemplary embodiment that the transistors constituting pixel 110 are NMOS transistors, the polarity may be inverted. That is, the transistors constituting pixel 110 may be PMOS transistors.

Figure 4:
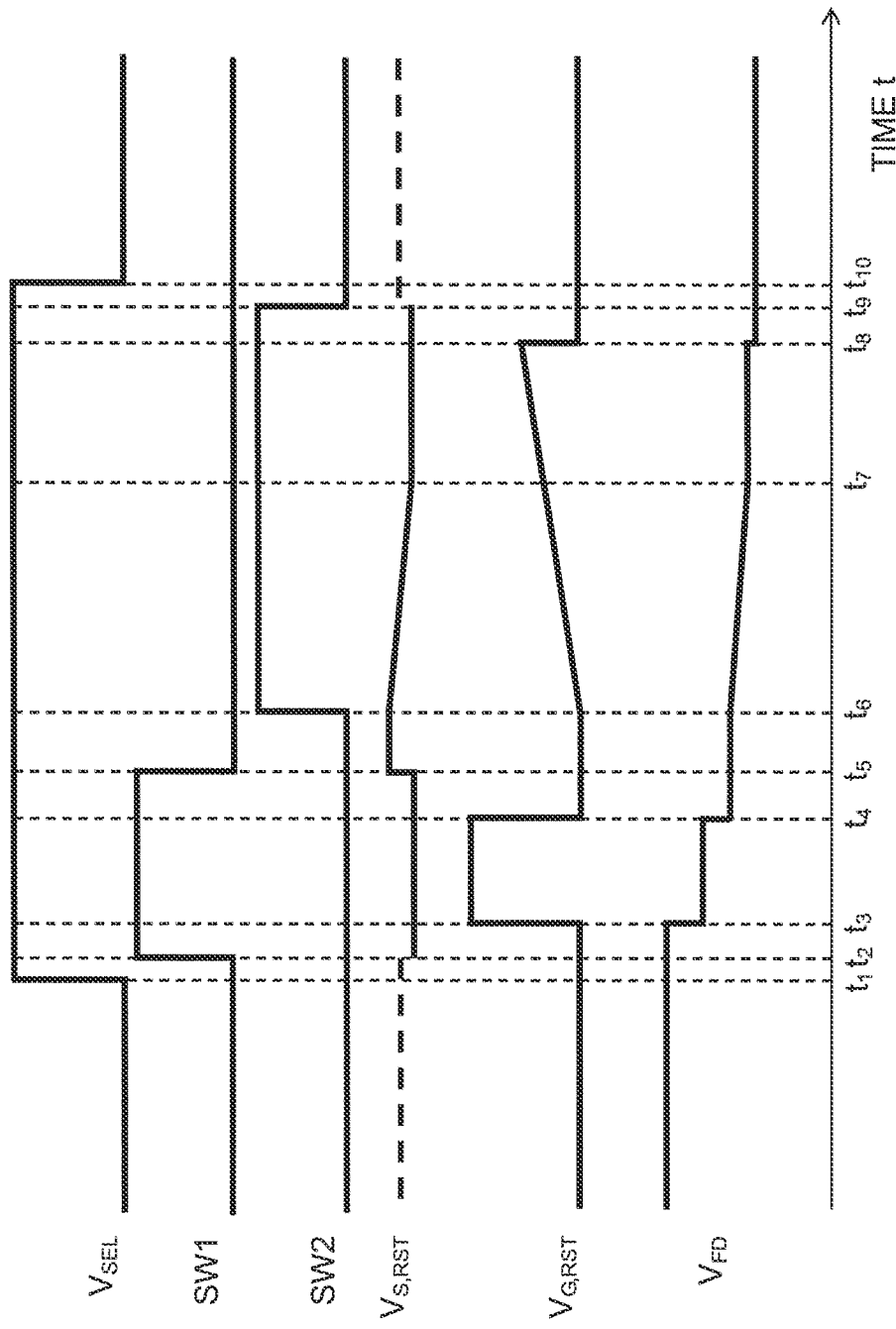
FIG. 4 is a timing chart showing a method of driving the solid-state imaging apparatus according to the first exemplary embodiment.

FIG. 4 is a timing chart showing a method of driving pixels in the m-th row including pixel 110 shown in FIG. 3 and their driving circuits. At time t1, the gate of each select transistor 302 is made to be a high level to select all pixels in the row including pixel 110. At time t2, switch (SW1) 308 is set to an ON state, so that the other of the source and drain of reset transistor 217 is connected to the output of reset level generating circuit 310 to be set to initial voltage $V_{RST}1$. An image signal stored in FD region 215 is read out between time t1 and time t2.

On or after time t2, a reset operation is performed to discharge the charge stored in the FD region. The reset operation includes a first period in which the negative feedback circuit is in an OFF state, and a second period which occurs after the first period and in which the negative feedback circuit is in an ON state. In the present exemplary embodiment, the ON/OFF of the negative feedback circuit is controlled, by turning ON or OFF switch (SW2) 309, such that the negative feedback circuit becomes the OFF state when switch (SW2) 309 is an OFF state and the negative feedback circuit becomes the ON state when switch (SW2) 309 is an ON state. At time t3, the gate of reset transistor 217 is set to a high level, so that reset transistor 217 changes from an OFF state to an ON state to reset the FD region to be the output level of the reset level generating circuit. Hereinafter, this reset operation will be referred to as the pre-reset operation. At time t4, reset transistor 217 is again changed to the OFF state to finish the pre-reset operation. At this time, the VD region becomes a floating state, and a slight voltage variation occurs in the FD region due to an influence of a parasitic capacitance between the gate and drain of reset transistor 217. At time t5, switch SW1 is made to be the OFF state to separate reset level generating circuit 310. At this time, since switch SW1 becomes the OFF state, the other of the source and drain of reset transistor 217 becomes a floating state. By the pre-reset operation, FD region 215 is set in average to a first potential which is initial voltage $V_{RST}1$ added with a slight voltage variation generated at the time of finishing the pre-reset operation. Also, a charge containing a kTC noise generated at the time of finishing the pre-reset operation remains in FD region 215. A typical pre-reset pulse width (=t4–t3) is 1 □sec to 10 □sec. Next, at time t0, switch (SW2) 309 is made to be the ON state to connect the other of the source and drain of reset transistor 217 to column signal line 307. By this connection, an output signal of amplifying transistor 216 is input through column signal line 303 to feedback amplifier 305, and an output signal of feedback amplifier 305 is fed back through column signal line 307 and reset transistor 217 to FD region 215, or the gate input part of amplifying transistor 216, in a negative feedback manner. That is, the negative feedback circuit becomes an ON state. On or after time t0, the other of the source and drain of reset transistor 217 is set to second potential $V_{RST}2$ which is dependent on voltage $V_{FD}$ of the FD region and $V_{REF}$. Supposing a gain of feedback amplifier 305 be A, $V_{RST}2$ can be expressed by the following formula (1):

$$V_{RST}2=(V_{REF}-T_{FD})A+V_{OFF} \quad (1)$$

The second potential is lower than the first potential, and the reset transistor at time t6 is set to such a state that the potential at the negative feedback circuit side is lower than the potential at the side of the FD region, while the channel is kept in the OFF state. On or after time t6, a reset transistor control voltage which changes gradually is input to the gate of reset transistor 217. The reset transistor control voltage is a tapered waveform voltage generated by tapered waveform generating circuit 109, and is applied through the row signal drive circuit to the gate of reset transistor 217. In the present exemplary embodiment, a tapered waveform of gradually increasing potential is applied to the gate of reset transistor 217. The reset transistor control voltage allows the reset transistor to gradually turn to the ON state. The tapered waveform typically has a gradient in a range from 100000 V/sec to 1000000 V/sec, and a peak voltage in a range from 100 mV to 500 mV. At time t7, the potential of FD region 215 reaches reference voltage level $V_{REF}$ set by the reference input of feedback amplifier 305, and subsequently holds this level until time t8.

Figure 5:
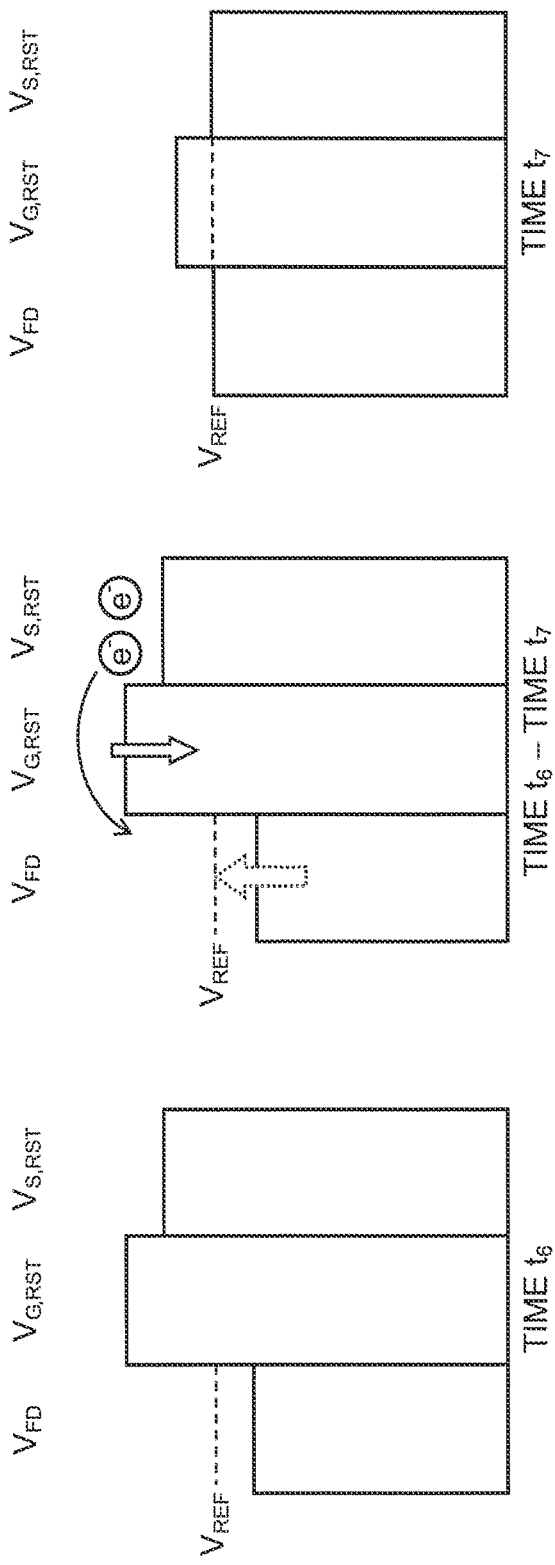
FIG. 5A is a potential diagram of the solid-state imaging apparatus according to the first exemplary embodiment.
FIG. 5B is a potential diagram of the solid-state imaging apparatus according to the first exemplary embodiment.
FIG. 5C is a potential diagram of the solid-state imaging apparatus according to the first exemplary embodiment.

Potential diagrams shown in FIG. 5A, FIG. 5B, and FIG. 5C show potentials of some parts at time t6, during time t6 to time t7, and on or after time t7, respectively. Since the reset transistor is an N-channel transistor in the present exemplary embodiment, the potential is lower on the upper side of the sheet, and is higher on the lower side of the sheet. When the reset transistor control voltage is applied, the FD region side of reset transistor 217 acts as the drain, and the negative feedback circuit side of reset transistor 217 acts as the source. Each of FIG. 5A to FIG. 5C shows the potential of FD region 215 ($V_{FD}$), the potential of the gate of reset transistor 217 ($V_{G,\,RST}$), and the potential of the source of reset transistor 217 ($V_{S,\,RST}$). The solid arrow indicates a direction of a voltage change caused by the application of the reset transistor control voltage, and the dashed arrow indicates a direction of a potential change caused by electron injection. At time t6, potential $V_{FD}$ of FD region 215 is different from $V_{REF}$, and specifically here higher by about 20 mV than $V_{REF}$. Incidentally, potential $V_{FD}$ may be set to be lower than $V_{REF}$. The potential of the gate of reset transistor 217 is set to a potential equal to or lower than its threshold voltage (Vt). Potential $V_{S,\,RST}$ of the source of reset transistor 217 is set to a value (about 100 mV or higher) that is adequately higher than the potential of the gate. By the setting of these potentials, reset transistor 217 is in the OFF state, and at the same time, a potential difference is generated between the source region and the FD region. This state is shown in FIG. 5A. By applying the tapered waveform voltage to the gate of reset transistor 217 on or after time t6, the gate-source voltage of reset transistor 217 gradually reduces, so that electrons are injected from the source to the channel, and flown into FD region 215. This state is shown in FIG. 5B. Since the potential of the source is closer to the gate voltage than the potential of the FD region, electrons are injected unilaterally from the source to the channel, so that there is no inverse current flow caused due to electron injection from the FD region. In other words, when the tapered waveform voltage is applied, the FD region side of the reset transistor is in the OFF state, and the source is in a state biased to a weak inversion state. By continuing this operation of electron injection from the source, potential $V_{FD}$ of FD region 215 asymptotically approaches to $V_{REF}$. As the two potentials become closer to each other, the changing rate of $V_{FD}$ decreases, and simultaneously when the two potentials become equal to each other at time t7 as shown in FIG. 5C, potential $V_{FD}$ is fixed to $V_{REF}$. This potential fixing operation will be described below. When a difference of potential $V_{FD}$ from $V_{REF}$ is caused in the negative direction (in the upward direction on the sheet), the potential of the source of reset transistor 217 is controlled to change in the positive direction (in the downward direction on the sheet) by the feedback, so that the amount of electrons injected to the channel of reset transistor 217 reduces. That is, such a negative feedback operation is caused that allows potential $V_{FD}$ to return toward the positive direction. On the contrary, when a difference of potential $V_{FD}$ from $V_{REF}$ is caused in the positive direction, the potential of the source of reset transistor 217 is controlled to change in the negative direction by the feedback, so that the amount of electrons injected to the channel of reset transistor 217 increases. That is, such a negative feedback operation is caused that allows potential $V_{FD}$ to return toward the negative direction. The above-described negative feedback operation allows potential $V_{FD}$ to be fixed to $V_{REF}$. In the present exemplary embodiment, even in a case where $V_{FD}$ becomes lower than $V_{REF}$, the input of the tapered waveform voltage to the gate causes $V_{FD}$ to increase, so that the negative feedback can be continued.

After $V_{FD}$ has been fixed to $V_{REF}$ at time t7, the input of the tapered waveform voltage to the gate of the reset transistor is finished at t8, and switch SW2 is turned OFF at time t9 to disconnect the feedback amplifier. Then, the select transistor is turned OFF to complete the reset operation.

According to the reset operation of the present exemplary embodiment, potential $V_{FD}$ of FD region 215 can be fixed to $V_{REF}$ in the final state of the reset operation, even if the kTC noise component remains right after the pre-reset operation, so that the kTC noise can be reduced.

Also, according to the reset operation of the present exemplary embodiment, the noise cancellation can be completed in the period in which the potential of FD region 215 changes from the first potential set by the pre-reset operation to the potential fixed to $V_{REF}$. Consequently, the time necessary for noise cancellation can be largely reduced.

Incidentally, the above description has been made in the case that the reset transistor is an NMOS transistor. As a modification of the present exemplary embodiment, a case that the reset transistor is a PMOS transistor will be described below.

Figure 6:
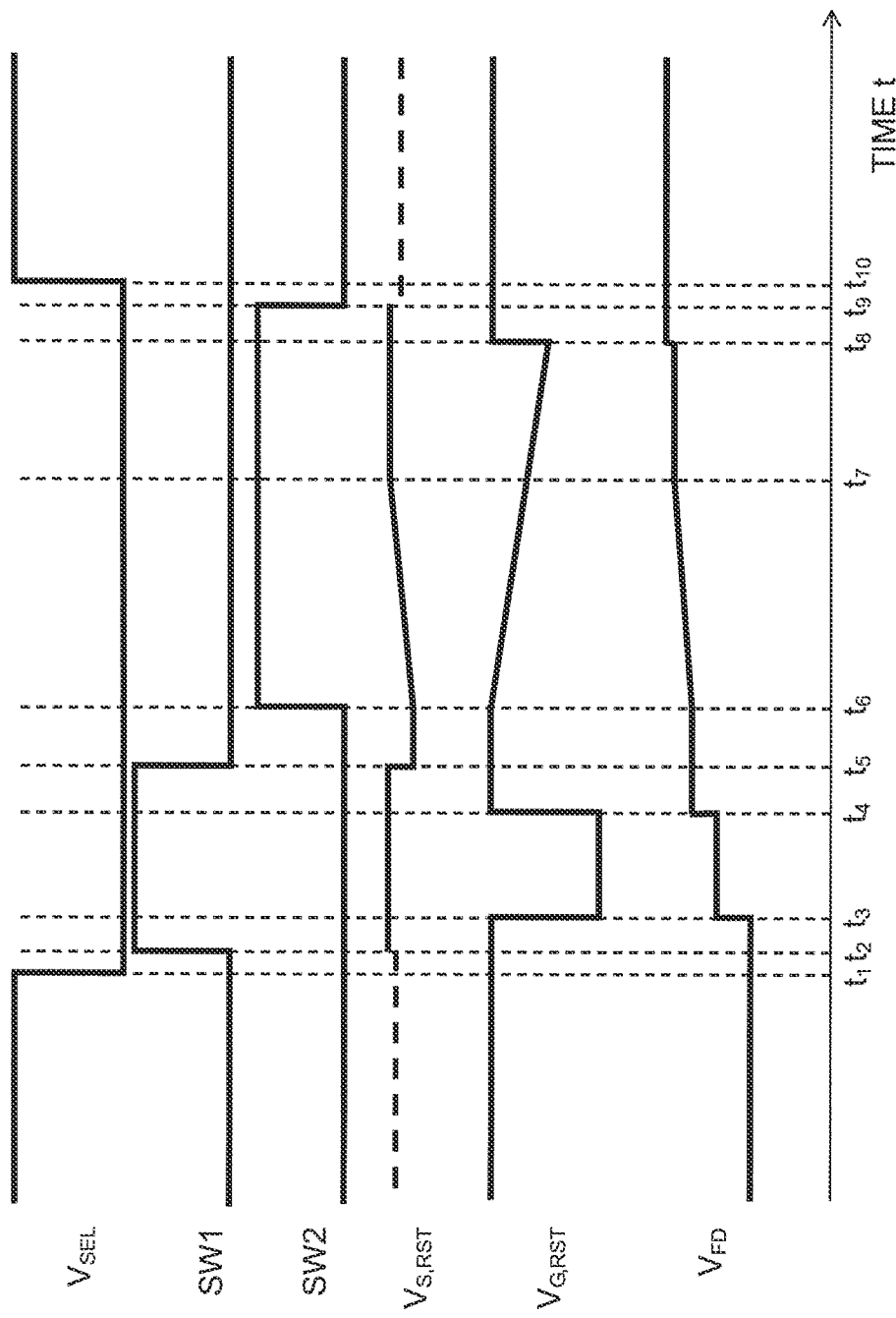
FIG. 6 is a timing chart showing a method of driving a solid-state imaging apparatus according to a modified example of the first exemplary embodiment.

FIG. 6 is a timing chart showing potentials of some parts in the case where the reset transistor is a PMOS transistor. The potential diagrams shown in FIG. 6A to FIG. 5C can be applied to the case where the reset transistor is a PMOS transistor, under the condition that the potential is higher on the upper side of the sheet, and lower on the lower side of the sheet. Therefore, in the case where the reset transistor is a PMOS transistor, the second potential (the potential of the source) is set to a potential higher than the first potential (the potential of the FD region) at time t6 to become the potential relationship as shown in FIG. 5A. On or after time t6, as shown in FIG. 6, a tapered waveform of gradually reduced potential is applied to the gate of the reset transistor.

Second Exemplary Embodiment

A solid-state imaging apparatus and a method of driving the same according to a second exemplary embodiment will be described. A sectional view of the solid-state imaging apparatus according to the second exemplary embodiment is the same as that of the first exemplary embodiment shown in FIG. 2. Accordingly, description on the sectional view will be omitted.

Figure 7:
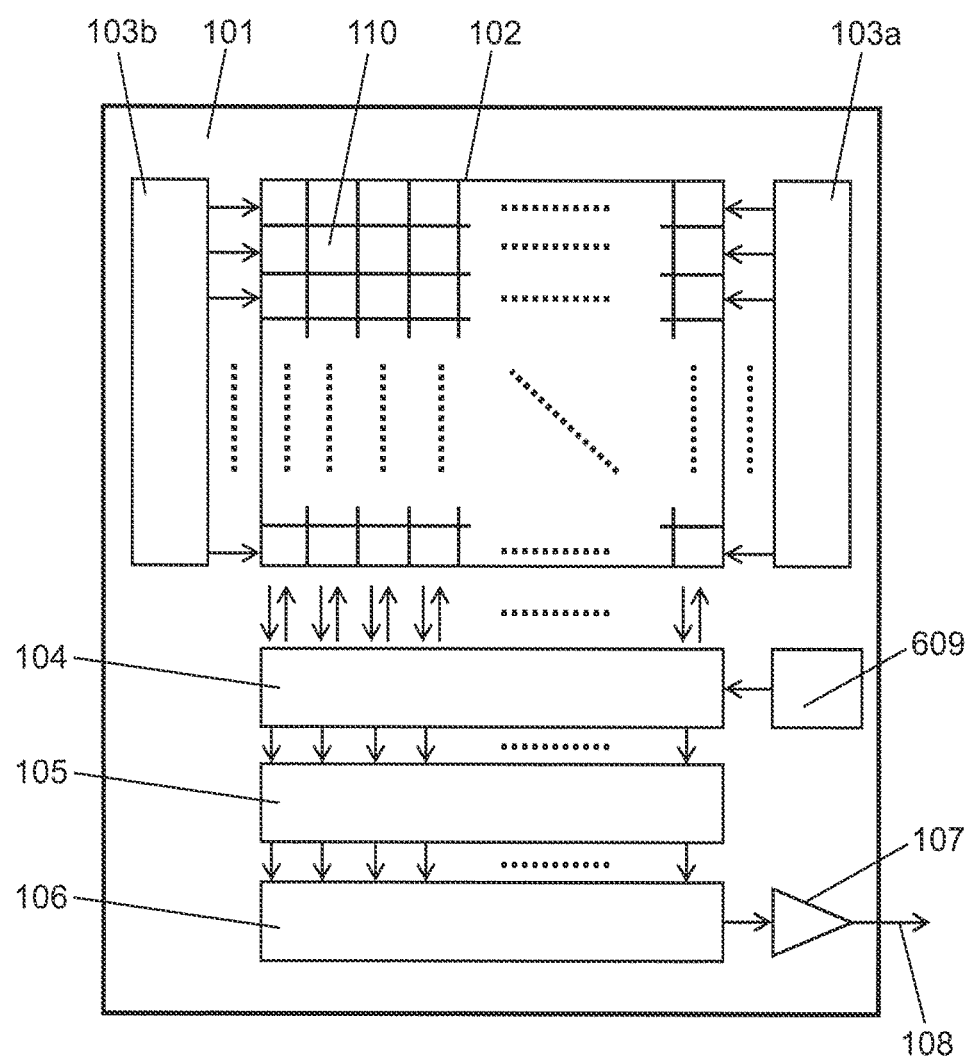
FIG. 7 is a block diagram showing a configuration of a solid-state imaging apparatus according to a second exemplary embodiment.

FIG. 7 is a block diagram showing a configuration of solid-state imaging apparatus 101 according to the second exemplary embodiment. Solid-state imaging apparatus 101 has pixel array 102, row signal drive circuits 103a and 103b, column circuits 104 disposed on a column by column basis, noise canceller circuits 105 such, for example, as correlated double sampling (CDS) circuits disposed on a column by column basis, horizontal drive circuit 106, and output stage amplifier 107. Circuit 609 is a tapered waveform generating circuit. A signal generated by this circuit is applied through column circuits 104 to the reset transistors of respective pixels at the time of resetting each row.

Figure 8:
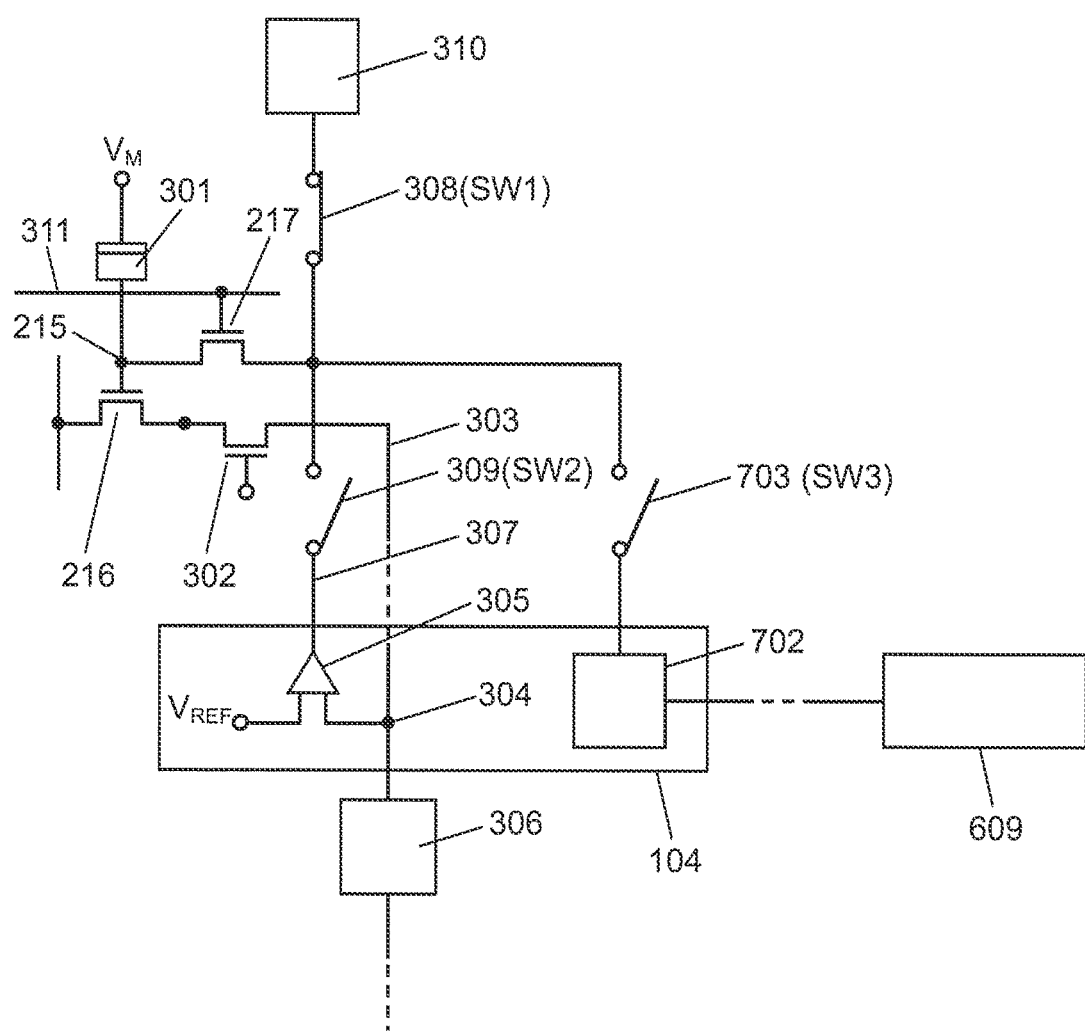
FIG. 8 is a circuit diagram of the solid-state imaging apparatus according to the second exemplary embodiment.

FIG. 8 is a diagram showing an example circuit of pixel 110 which belongs to an m-th row (m: a natural number) and an n-th column (n: a natural number) in pixel array 102 and its control circuit according to the present exemplary embodiment. In FIG. 8 also, duplicate description on the parts which are substantially the same as the counterparts in the first exemplary embodiment will occasionally be omitted.

According to the present exemplary embodiment, the gate of reset transistor 217 is connected to row signal line 311 which is output from row signal drive circuits 103a and 103b. Also, feedback amplifier 305 is included in column circuit 104 of the column containing this pixel. Column circuit 104 includes buffer circuit 702 which transmits an output tapered signal from tapered waveform generating circuit 609 to the column. An output of buffer circuit 702 is connected through switch (SW3) 703 to the other of the source and drain of reset transistor 217.

Incidentally, although the transistors constituting pixel 110 are NMOS transistors in the present exemplary embodiment, this polarity may be reversed. That is, the transistors constituting pixel 110 may be PMOS transistors.

Figure 9:
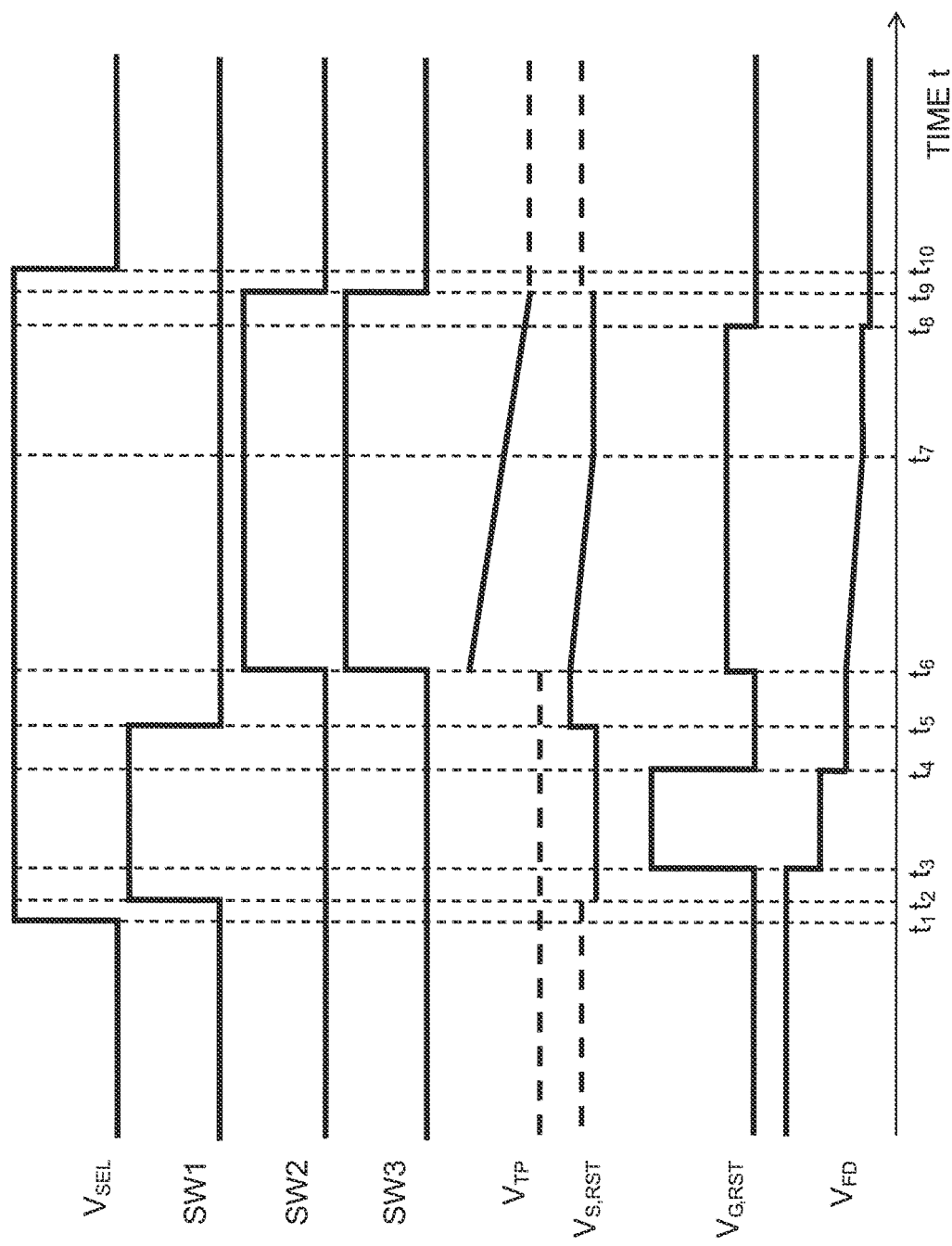
FIG. 9 is a timing chart showing a method of driving the solid-state imaging apparatus according to the second exemplary embodiment.
Figure 10A:
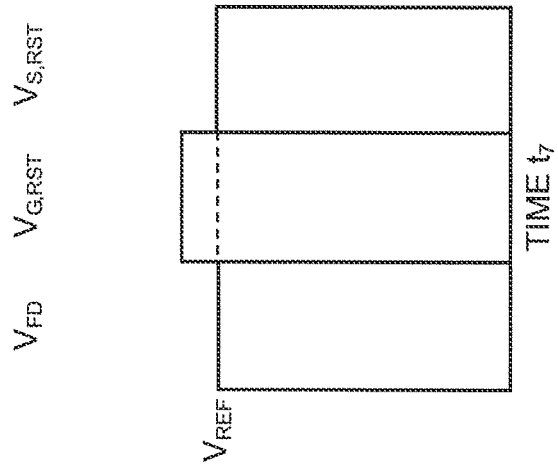
FIG. 10A is a potential diagram of the solid-state imaging apparatus according to the second exemplary embodiment.
Figure 10B:
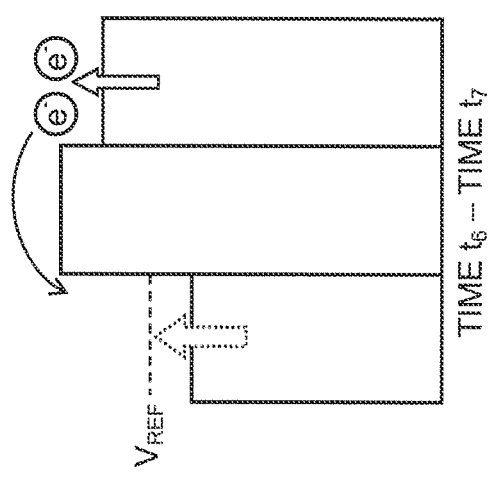
FIG. 10B is a potential diagram of the solid-state imaging apparatus according to the second exemplary embodiment.
Figure 10C:
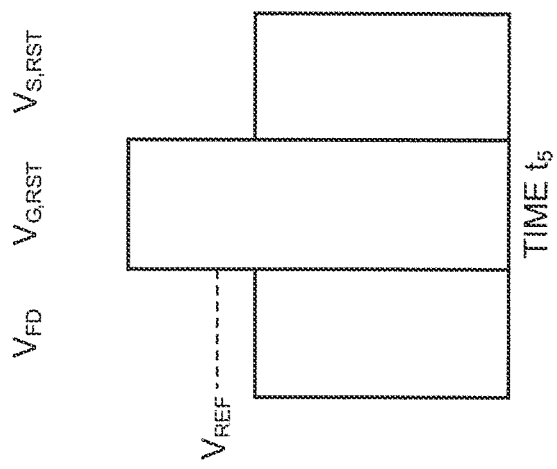
FIG. 10C is a potential diagram of the solid-state imaging apparatus according to the second exemplary embodiment.

FIG. 9 is a timing chart showing a method of driving the pixels in the m-th row including pixel 110 and their control circuits. The operations until time t5 are the same as those of the first exemplary embodiment. At this time, switch SW3 is in an OFF state. A potential diagram at time t5 is shown in FIG. 10A. Next, at time t6, each of switch SW2 and switch SW3 are turned to an ON state to allow both an output of feedback amplifier 305 and an output of buffer circuit 702 to be short-circuited to the other of the source and drain of reset transistor 217. Also, at time t6, such a gate voltage is applied to reset transistor 217 that makes the channel of reset transistor 217 be a weak inversion state. Also, on or after time t6, reset transistor control voltage $V_{TP}$ is input to the source of reset transistor 217 by being superposed on the output of feedback amplifier 305. This situation is shown in FIG. 10B. At time t7 shown in FIG. 10C, the potential of FD region 215 is fixed to fixed value $V_{REF}$.

According to the reset operation of the present exemplary embodiment, potential $V_{FD}$ of FD region 215 can be fixed to $V_{REF}$ in the final state of the reset operation, even if the kTC noise component remains right after the pre-reset operation, so that the kTC noise can be reduced.

Also, according to the reset operation of the present exemplary embodiment, the noise cancellation can be completed in the period in which the potential of FD region 215 changes from the first potential set by the pre-reset operation to the potential fixed to $V_{REF}$. Consequently, the time necessary for noise cancellation can be largely reduced.

Further, since the reset transistor control voltage is superposed on the output of the negative feedback circuit instead of being applied to the gate, any change of $V_{FD}$ due to a change in the gate potential does not occur. Consequently, control becomes easy.

Third Exemplary Embodiment

A solid-state imaging apparatus and a method of driving the same according to a third exemplary embodiment will be described. A sectional view of the solid-state imaging apparatus according to the third exemplary embodiment is the same as that shown in FIG. 2 described in conjunction with the first exemplary embodiment. Accordingly, description of the sectional view will be omitted. A block diagram showing a configuration of solid-state imaging apparatus 101 according to the second exemplary embodiment is the same as that of the second exemplary embodiment (FIG. 7), and thus is omitted.

Figure 11:
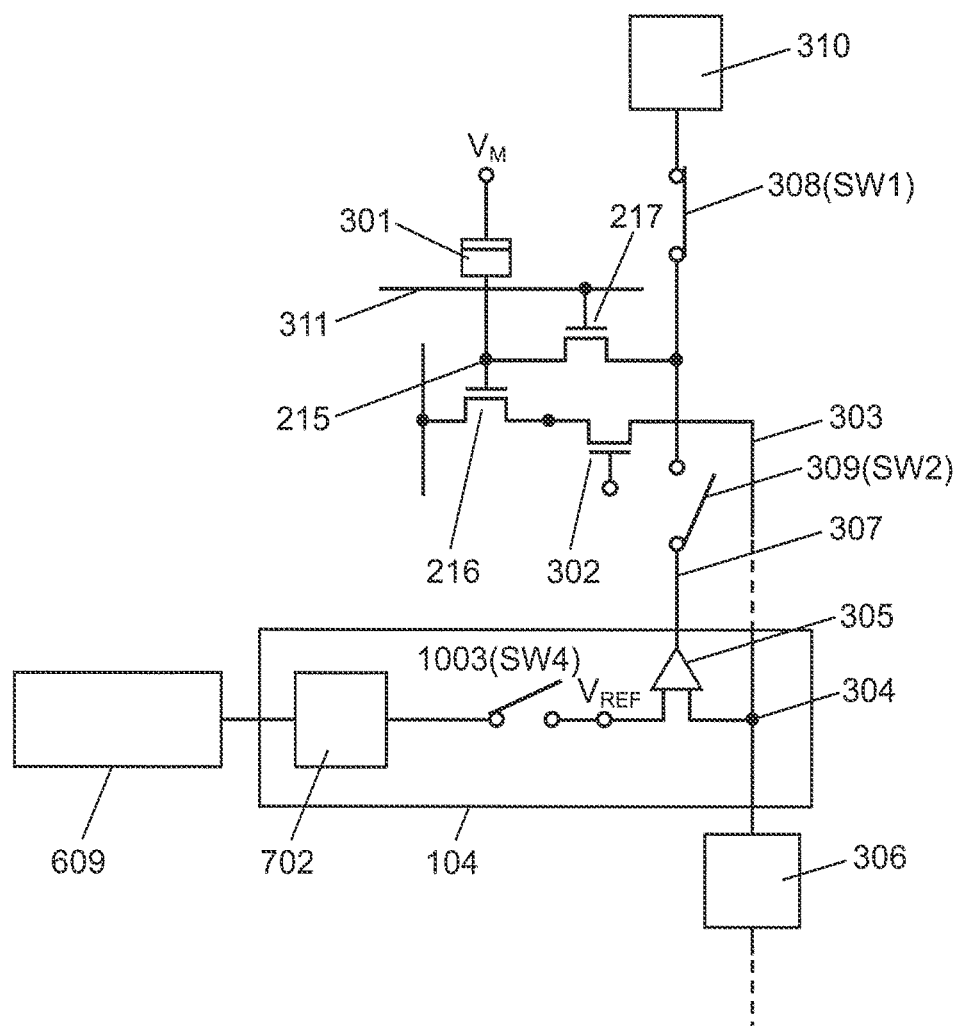
FIG. 11 is a circuit diagram showing a configuration of a solid-state imaging apparatus according to a third exemplary embodiment.

FIG. 11 is a diagram showing an example circuit of pixel 110 which belongs to an m-th row (in: a natural number) and an n-th column (n: a natural number) in pixel array 102 and its control circuit according to the present exemplary embodiment. With reference to FIG. 11 also, duplicate description on the parts substantially the same as those of the first or second exemplary embodiment may occasionally be omitted.

According to the present exemplary embodiment, feedback amplifier 305 is included in column circuit 104 of the column containing this pixel. Also, column circuit 104 includes buffer circuit 702 that transmits an output tapered signal from tapered waveform generating circuit 609 to the column. An output of buffer circuit 702 is input through switch (SW4) 1003 to the $V_{REF}$ input terminal of feedback amplifier 305 to be superposed on $V_{REF}$.

Incidentally, although the transistors constituting pixel 110 are NMOS transistors in the present exemplary embodiment, this polarity may be reversed. That is, the transistors constituting pixel 110 may be PMOS transistors.

Figure 12:
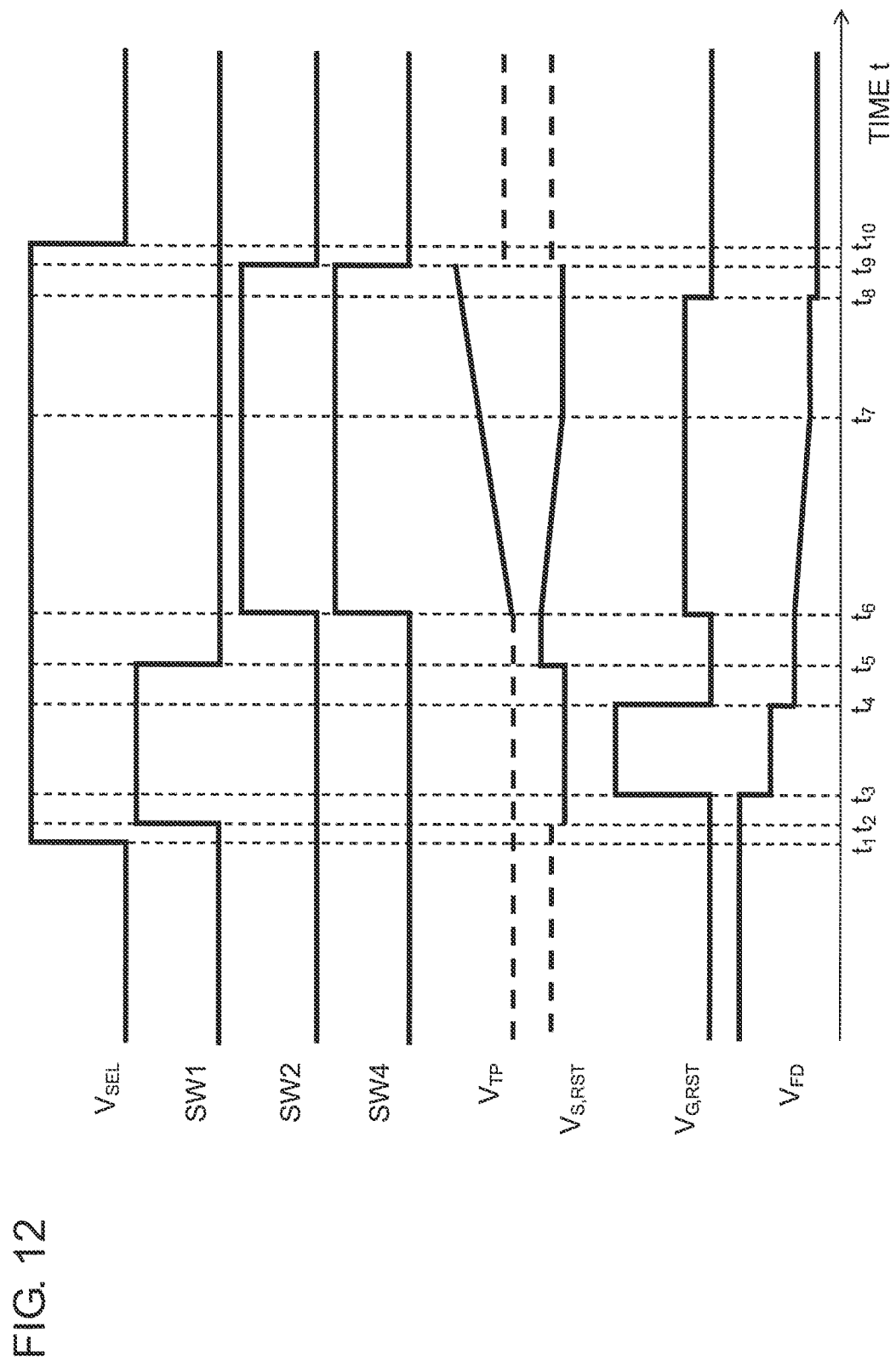
FIG. 12 is a timing chart showing a method of driving the solid-state imaging apparatus according to the third exemplary embodiment.

FIG. 12 is a timing chart showing a method of driving the pixels in the m-th row including pixel 110 shown in FIG. 11 and their control circuits. The operations until time t5 are the same as those of the second exemplary embodiment. At this time, switch SW4 is in the OFF state. The potential diagram at time t5 (FIG. 13A) is the same as that at time t5 in FIG. 10A. Next, switch SW2 is turned to the ON state at time t6 to short-circuit the output of feedback amplifier 305 to the source of reset transistor 217. Also, at time t6, switch SW4 is turned to the ON state to input the output of buffer circuit 702 to the $V_{REF}$ input terminal of feedback amplifier 305. Also, at time t6, such a gate voltage is applied that allows the channel of reset transistor 217 to become a weak inversion state. Also, on or after time t6, reset transistor control voltage $V_{TP}$ is input to the $V_{REF}$ input terminal of feedback amplifier 305 by being superposed on $V_{REF}$. At time t7, the potential of FD region 215 is fixed to fixed value $V_{REF}$.

Figure 13C:
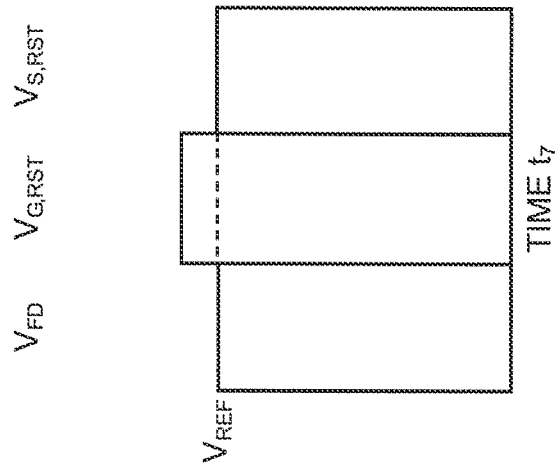
FIG. 13C is a potential diagram of the solid-state imaging apparatus according to the third exemplary embodiment.
Figure 13B:
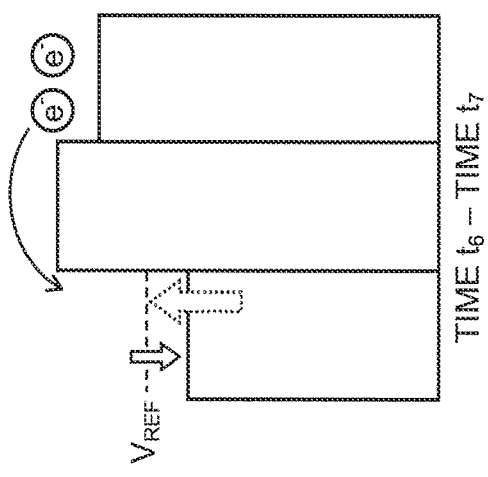
FIG. 13B is a potential diagram of the solid-state imaging apparatus according to the third exemplary embodiment.
Figure 13A:
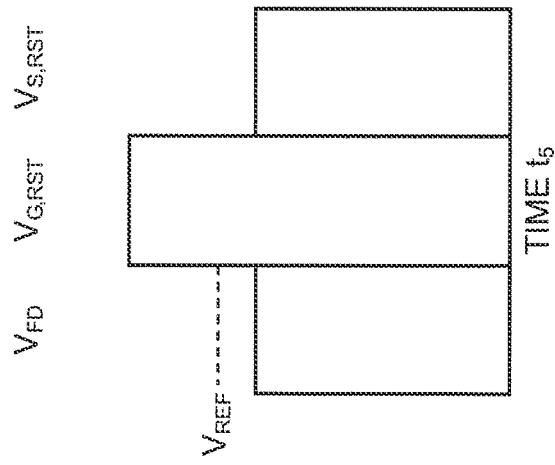
FIG. 13A is a potential diagram of the solid-state imaging apparatus according to the third exemplary embodiment.
Figure 14:
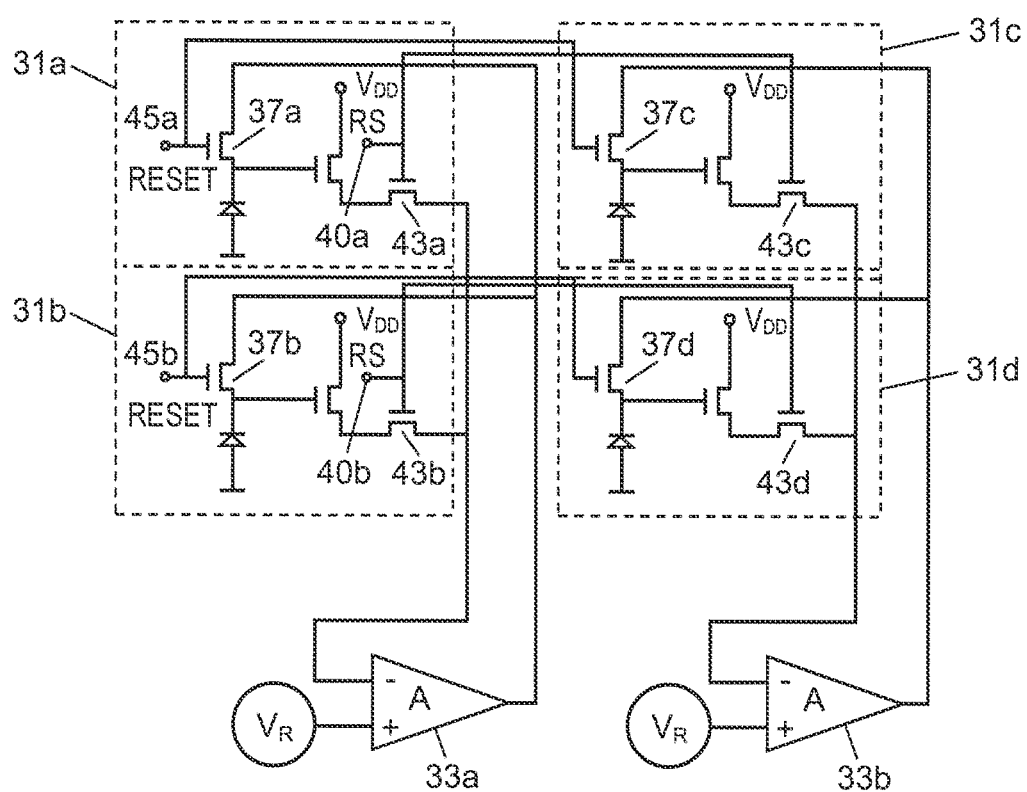
FIG. 14 is a circuit diagram showing a conventional solid-state imaging apparatus.

A potential diagram at times t6 and t7 is shown in FIG. 13B. The relations among the potentials of the respective parts are the same as those at the corresponding times t6 and t7 shown in FIG. 5B. However, a different point is that the reset transistor control voltage is superposed on $V_{REF}$. A potential varying direction of $V_{REF}$ overwritten in the FD region in FIG. 13B is indicated by a solid arrow, if $V_{FD}$ at tune t6, or the first potential, is set higher than $V_{REF}$, a reset transistor control voltage in the positive direction (the downward direction on the sheet) is applied as shown in FIG. 13B. On the contrary, if $V_{FD}$ at time t6 is set lower than $V_{REF}$, a reset transistor control voltage in the negative direction (the upward direction on the sheet) is applied.

According to the reset operation of the present exemplary embodiment, potential $V_{FD}$ of FD region 215 can be fixed to $V_{REF}$ in the final state, even if the kTC noise component remains right after the pre-reset operation, so that the kTC noise can be reduced.

Also, according to the reset operation of the present exemplary embodiment, noise cancellation can be completed in the period from the time the potential of FD region 215 is set to the first potential by the pre-reset operation to the time the potential is fixed to $V_{REF}$, so that the time required for noise cancellation can be largely reduced.

Incidentally, the above-described exemplary embodiments may be applied individually or may be applied in combination. Specifically, the reset transistor control voltage may be input to all three of the gate of reset transistor 217, the source of reset transistor 217 and the $V_{REF}$ input terminal of the negative feedback circuit, or may be input to any two of these. By applying the reset transistor control voltage to plural parts in this manner, the time required for noise cancellation can be further reduced.

INDUSTRIAL APPLICABILITY

A solid state imaging apparatus according to the present invention applicable to digital still cameras, medical use cameras, security cameras, digital single lens reflex cameras, digital mirrorless cameras, and the like.

REFERENCE MARKS IN THE DRAWINGS 101 solid state imaging apparatus
102 pixel array
103a, 103b row signal drive circuit
104 column circuit
105 noise canceller circuit
106 horizontal drive circuit
107 output stage amplifier
108 sensor output
110 pixel
201 microlens
202 blue color filter
203 green color filter
204 red color filter
205 protective film
206 planarization film
207 upper electrode
208 photoelectric conversion film
209 electron blocking layer
210 interelectrode insulating film
211 lower electrode
212 interwiring insulating film
213 power feeding layer
214 wiring layer
215 floating diffusion (FD) part (charge storage region)
216 amplifying transistor
217 reset transistor
218 substrate
219 well
220 shallow trench isolation (STI) region
221 interlayer dielectric layer
301 photoelectric conversion region
302 select transistor
303 column signal line
304 column signal line branch point
305 feedback amplifier
306 column signal readout circuit
307 column signal line
308 switch (SW1)
309 switch (SW2)
310 reset level generating circuit
311 row signal line
312 buffer circuit

The invention claimed is:
1. An imaging device comprising:
a photoelectric converter that generates signal charge;

a charge storage region that stores the signal charge;

a first transistor that has a gate coupled to the charge storage region and reads out the signal charge;

a second transistor that has a source and a drain, an output of the first transistor being fed back to one of the source and the drain and being supplied to the charge storage region from the other of the source and the drain; and voltage supply circuitry that supplies voltages varying with time, wherein in a reset operation for discharging the signal charge stored in the charge storage region, the voltage supply circuitry supplies the voltages to a gate of the second transistor so that the second transistor gradually changes from an OFF state to an ON state.

2. The imaging device according to claim 1, wherein, in an initial phase of the reset operation, a potential of the charge storage region is a first potential, and a potential of the one of the source and the drain of the second transistor is a second potential, and the second potential is lower than the first potential in a case where the second transistor is an NMOS transistor, and the second potential is higher than the first potential in a case where, the second transistor is a PMOS transistor.

3. The imaging device according claim 1, wherein the voltages have a tapered waveform.

4. The imaging device according to claim 1, wherein, when the voltages are applied, the second transistor is in an OFF state at a side of the other of the source and the drain and is biased in a weak inversion state at a side of the one of the source and the drain.

5. A imaging device comprising:

a photoelectric converter that generates signal charge;

a charge storage region that stores the signal charge;

a first transistor that has a gate coupled to the charge storage region and reads out the signal charge;

a second transistor that has a source and a drain, an output of the first transistor being fed back to one of the source and the drain and being supplied to the charge storage region from the other of the source and the drain; and voltage supply circuitry that supplies voltages varying with time, wherein in a reset operation for discharging the signal charge stored in the charge storage region, the voltage supply circuitry supplies the voltages to the one of the source and the drain of the second transistor so that the second transistor gradually changes from an OFF state to an ON state.

6. The imaging device according to claim 5, wherein, in an initial phase of the reset operation, a potential of the charge storage region is a first potential, and a potential of the one of the source and the drain of the second transistor is a second potential, and the second potential is lower than the first potential in a case where the second transistor is an NMOS transistor, and the second potential is higher than the first potential in a case where the second transistor is a PMOS transistor.

7. The imaging device according claim 5, wherein the voltages have a tapered waveform.

8. The imaging device according to claim 5, wherein, when the voltages are applied, a voltage that makes a channel of the second transistor be a weak inversion state is input to a gate of the second transistor.

9. The imaging device according to claim 5, wherein, when the voltages are applied, the second transistor is in an OFF state at a side of the other of the source and the drain and is biased in a weak inversion state at a side of the one of the source and the drain.

10. A imaging device comprising:

a photoelectric converter that generates signal charge;

a charge storage region that stores the signal charge;

a first transistor that has a gate coupled to the charge storage region and reads out the signal charge;

a second transistor that has a source and a drain, an input to one of the source and the drain being supplied to the charge storage region from the other of the source and the drain;

a feedback amplifier that feeds back an output of the first transistor in a negative feedback manner to the one of the source and the drain of the second transistor, the feedback amplifier having two input terminals, the output of the first transistor being input to a first input terminal, a reference voltage being input to a second input terminal; and voltage supply circuitry that supplies voltages varying with time, wherein in a reset operation for discharging the signal charge stored in the charge storage region, the voltage supply circuitry supplies the voltages to the second input terminal of the feedback amplifier so that the second transistor gradually changes from an OFF state to an ON state.

11. The imaging device according to claim 10, wherein, in an initial phase of the reset operation, a potential of the charge storage region is a first potential, and a potential of the one of the source and the drain of the second transistor is a second potential, and the second potential is lower than the first potential in a case where the second transistor is an NMOS transistor, and the second potential is higher than the first potential in a case where the second transistor is a PMOS transistor.

12. The imaging device according claim 10, wherein the voltages have a tapered waveform.

13. The imaging device according to claim 10, wherein, when the voltages are applied, a voltage that makes a channel of the second transistor be a weak inversion state is input to a gate of the second transistor.

14. The imaging device according to claim 10, wherein, when the voltages are applied, the second transistor is in an OFF state at a side of the other of the source and the drain and is biased in a weak inversion state at a side of the one of the source and the drain.

* * * * *